United States Patent [19]

Wegener

[11] 4,157,301
[45] Jun. 5, 1979

[54] DRUM CONSTRUCTION FOR ROTARY DRUM FILTER

[75] Inventor: Willi A. Wegener, Salt Lake City, Utah

[73] Assignee: Envirotech Corporation, Menlo Park, Calif.

[21] Appl. No.: 886,837

[22] Filed: Mar. 15, 1978

[51] Int. Cl.² .............................................. B01D 33/08
[52] U.S. Cl. .................................................... 210/404
[58] Field of Search ................ 210/391, 392, 395–397, 210/402, 404

[56] References Cited

U.S. PATENT DOCUMENTS

| | | | |
|---|---|---|---|
| 2,289,762 | 7/1942 | Duvall | 210/404 X |
| 3,027,011 | 3/1962 | Flynn | 210/404 |

Primary Examiner—William A. Cuchlinski, Jr.
Attorney, Agent, or Firm—Robert E. Finch; Robert E. Krebs; Thomas S. MacDonald

[57] ABSTRACT

Filter drum having its surface divided by longitudinal division strips into a plurality of separate filtration sectors each of which is provided with a plurality of lead and trail ports. In each sector, all lead ports communicate with a single manifold through ports in the manifold wall, the manifold is in turn connected to a filter valve by a single conduit; and all trail ports register with ports in another manifold in turn connected by a single conduit to the filter valve. The manifolds are formed as rectangular conduits secured to the inside of the drum wall and extending the full length thereof. The boundaries between adjacent manifolds are located under division strips. The manifold for a given sector is physically located next to the manifold connected to the lead port for the next succeeding adjacent sector. The ports are formed as elongated slots in the drum deck as close as possible and parallel to the division strip. Corresponding slots are formed in the manifold; and the deck and manifold are seal welded to each other around the periphery of the slots. The trail slots and lead slots are staggered with respect to each other.

2 Claims, 4 Drawing Figures

DRUM CONSTRUCTION FOR ROTARY DRUM FILTER

FIELD AND BACKGROUND OF THE INVENTION

This invention relates to rotary drum vacuum filters in which the drum surface is divided into individual elongated sectors each of which is provided with lead and trail outlets.

More specifically, the invention is directed to an improved drum construction and piping arrangement for such a filter.

It is a common filtration practice to equip a drum filter with so-called lead and trail outlets for more efficient removal of filtrate and wash liquids. Also, it is known to arrange the valve operation to conduct a so-called purge or sweep in which prior to cake discharge pressured air enters through ports on the trailing side of the sector and is withdrawn through the ports in the descending side of the sector.

In the usual drum, each filtrate outlet port of a sector connects to the filter valve through its own internal pipe. The result is a complex plurality of internal pipes that terminate in ports in a trunnion which register successively with appropriate zones of the filter valve. As is well known, the valve connects through a vacuum receiver to a vacuum pump. The valve may also have a vent to atmosphere and/or a connection to pressured gas or liquid. With appropriate settings, the valve sequentially applies vacuum to the sectors for cake formation, washing and drying. It may also be set to release vacuum and supply pressured gas to the sector as an aid in cake discharge.

In large filters, many outlets are required hence the piping becomes complicated and costly to install and maintain. In addition, the internal piping system limits the hydraulic capacity of the filter. Another problem in large filters is the need for extra structural members to insure physical integrity of the drum.

SUMMARY OF THE INVENTION

It is the primary object of this invention to provide an improved drum construction by which the piping is simplified and at the same time utilized as reinforcing for the drum.

Another object is the provision of a simplified piping system of relatively increased hydraulic capacity thereby to maximize filter rate.

A related object is the provision of a filter piping having lead and trail pipes in which blow back is accomplished without cake wetting due to residual filtrate.

The foregoing and possibly other objects are achieved by a drum construction in which rectangular conduits are employed as manifolds through which the filter sectors are connected to the filter valve.

The manifolds extend the length of and are secured to the inside wall of the drum shell. Outlets are cut directly through the drum and top manifold wall. Each sector is connected to a trail manifold and as shown, usually also to a lead manifold. The manifolds of adjacent sectors are placed directly next to each other. That is, the trail manifold for one sector is next to the lead manifold of an adjacent sector; and the joint between adjacent manifolds is directly under a division strip between filter sectors. The filtrate ports in the manifolds are in the top manifold wall next to the sidewall closest the adjacent manifold.

In connection with the shape of the manifolds, it will be appreciated that a construction with straight sidewalls between adjacent manifolds enables the manifolds to be closer together thus putting the outlet ports closer to the division strip than if round manifolds were used. This is important because locating the ports close to the division strips enhances filtrate removal through the trail port as it ascends and through the lead port as it descends.

In order that the invention may be more fully comprehended and carried into effect, reference is made to the accompanying drawings and description thereof which are offered by way of example and not in limitation of the invention, the scope of which is defined by the appended claims and equivalents thereof.

DETAILED DESCRIPTION OF THE INVENTION

Figure 1:
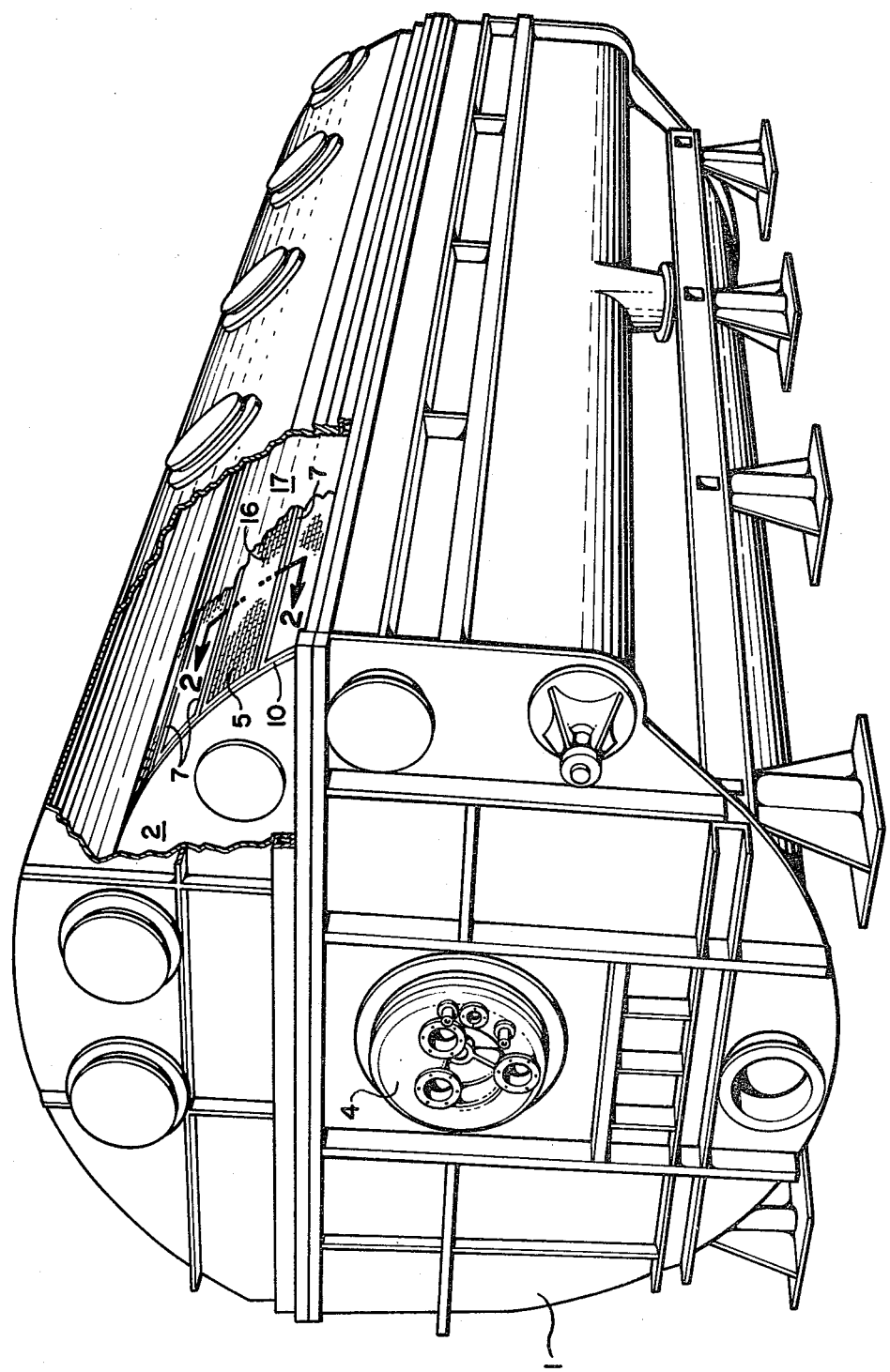
FIG. 1 is a perspective view of a rotary drum vacuum filter embodying the invention, portions being cut away to illustrate internal parts.
Figure 2:
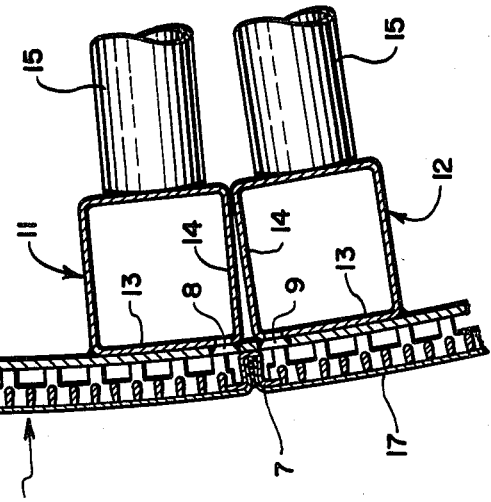
FIG. 2 is a partial sectional view of the drum of the filter of FIG. 1 taken in the plane of line 2—2 of FIG. 1 looking in the direction of the arrows 2.

As illustrated, the basic filter comprises a tank 1, a drum 2 mounted for rotation on usual trunnions 3 that are journalled in bearings on the end walls of the tank, rotation being effected by a usual drive while vacuum and/or pressure is applied through a filter valve 4 which operates in known manner in conjunction with axially extending ports in the trunnion that connect to filtration sectors 5 defined on the drum surface 6 between longitudinally extending division strips 7 and outwardly extending flanges 10 on the ends of the drum.

Each sector 5 is provided with lead ports 8 adjacent its leading edge and trail ports 9 adjacent the trailing edge. As used herein, the words lead and trail have reference to the direction of drum rotation. As illustrated, all lead ports of a single sector communicate with a common lead manifold 11 and all trail ports of a sector with a common trail manifold 12. A single conduit 15 then connects each manifold with one of the ports in the trunnion. This reduces the number of internal pipes and enables the use of larger pipes and larger ports in the trunnion thus enhancing hydraulic efficiency of the filter.

The manifolds are rectangular and the manifolds of a given sector are located as close as possible to the manifold of adjacent sectors with the joint preferably directly under a division strip. Thus, the trail manifold 12 of a sector 5 is located next to the lead manifold 11 of the next succeeding sector; and the centerline between the manifolds is under the division strip 7 between sectors. The manifolds are utilized as structural members for the drum by tack welding them together and securing them along their length, either with a continuous weld or a series of tack welds to the interior wall of the drum. Also, the ports in the drum wall and those in the top wall of the manifold are in registration with each other and their peripheral edges are sealed together, usually by welding.

A plurality of both lead and trail ports 8 and 9 are provided in each sector. The ports are formed as elongated slots located as close as possible and parallel to a division strip. This insures presentation of maximum opening for liquid flow when the port is on the low side of the sector. Also, the slotted port is quite easy to seal weld to a corresponding port in the top wall 13 of the manifold with which it registers to provide communication to the manifold.

Figure 3:
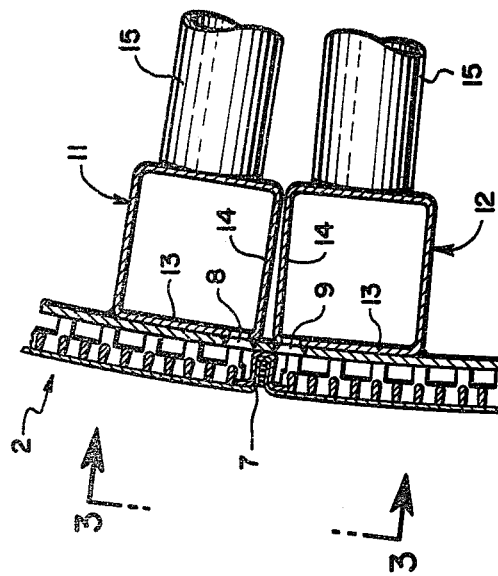
FIG. 3 is an elevational view of a part of the drum surface of FIG. 2 looking in the direction of arrows 3, the drainage grid being omitted for clarity.
Figure 3:
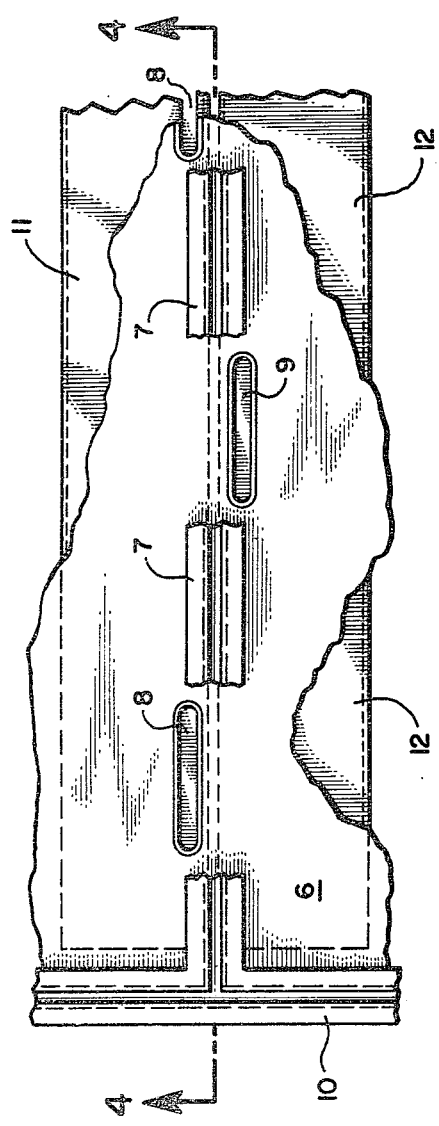
Figure 4:
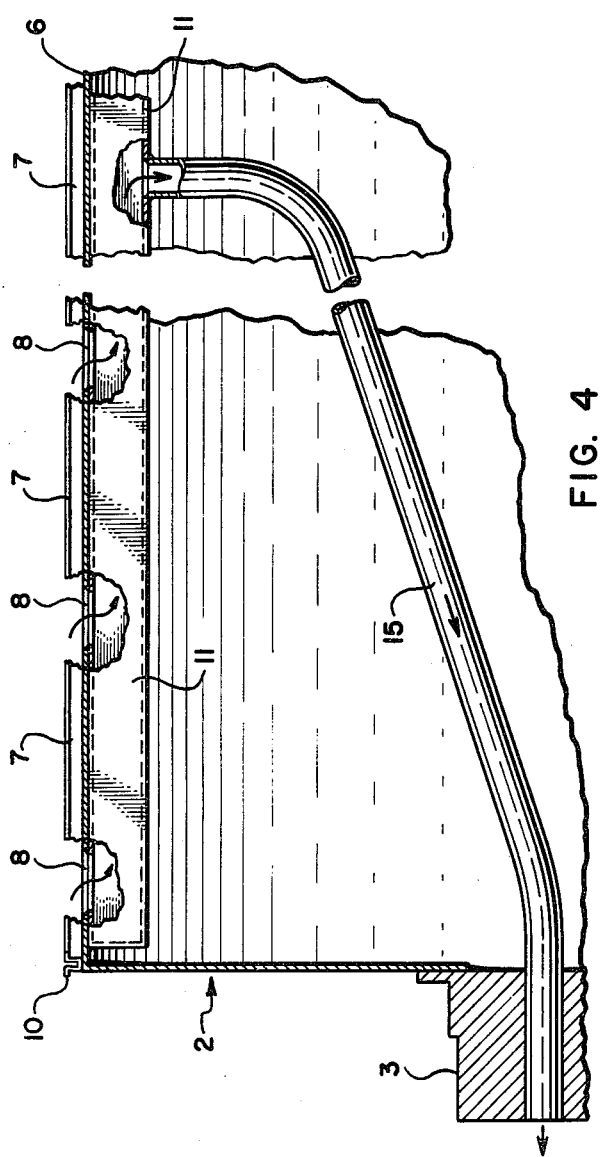
FIG. 4 is a section of the structure of FIG. 3 taken as looking in the direction of arrows 4 of FIG. 3.

Location of the slotted opening with respect to the manifold side wall 14 nearest the division strip is important. As shown, one side of the slot should be close aboard the top edge of the sidewall 14. This keeps slots adjacent the lower edge of the sector at all times while the drum is out of the slurry, whether the sector is ascending or descending thus enhancing filtrate removal. The slot location is also an aid to cake discharge by gas blowback through the trail slot 9. This is so because when a sector is descending to the discharge level the trail port 9 is at the top and the manifold acts to trap and retain residual or entrained moisture that would otherwise be carried back into the filter cake when pressured gas is supplied through the trail port for cake discharge. Further, location of the ports at the extreme opposite sides of the sector insures sweeping of the complete sector during purge when positive pressured gas is introduced through the trail slot and withdrawn under vacuum through the descending lead port. Complete sweeping is further enhanced by staggering the lead and trail ports with respect to each other as shown in FIG. 3.

The filter is provided with a drainage grid 16 secured between the division strips 7 and a filter cloth 17 suitably secured in place by conventional caulking and wire windings. A usual deflector blade to guide discharged cake into a cake removal scroll or other conveyor is provided.

Although the illustrated embodiment is of a filter equipped with a cover for use in special processes such as separation of solvent and wax, the invention is not limited to covered filters, but may be utilized in any drum filter.

I claim:

1. A filter drum comprising a cylinder equipped with trunnions on opposite ends and having its curved outer wall surface divided by longitudinally extending division strips into a plurality of filter sectors extending end to end of said drum, a flange at each end of said drum closing the ends of said sectors, a plurality of ports in one of said trunnions extending axially therethrough, a plurality of slots in the surface of said drum spaced apart along at least one side of each of said sectors close and parallel to said division strips, at least one manifold extending the length of the inner wall of said drum located under one side edge of each said sector, said manifold being a closed conduit having a flat wall adjacent said inner wall of said drum and being secured thereto, slots in the top wall of said manifold in registration with said slots in said drum, means sealingly connecting the peripheral edges of said slots in said manifold with the peripheral edges of said slots in said drum, said manifold being connected by a single conduit to a port in one of said trunnions, and said manifold being secured directly to the inner wall of said drum.

2. A filter drum according to claim 1 in which there are slots along both sides of each of said sectors close to said division strips, a manifold is provided under each side of said sector and has slots in registration and sealingly connected with said slots in said drum wall each of said manifolds being connected to a port in said trunnion by a single conduit, said manifolds are formed rectangular so that a straight wall is next to the inner drum surface and adjacent walls of adjacent manifolds are straight, and both of said manifolds are secured directly to the inner wall of said drum.

* * * * *